(12) United States Patent
Duex

(10) Patent No.: US 7,185,671 B2
(45) Date of Patent: Mar. 6, 2007

(54) ANGLED DUAL CHECK VALVE

(75) Inventor: Karl D. Duex, Potosi, WI (US)

(73) Assignee: A. Y. McDonald Mfg. Co., Dubuque, IA (US)

( * ) Notice: Subject to any disclaimer, the term of this patent is extended or adjusted under 35 U.S.C. 154(b) by 201 days.

(21) Appl. No.: 11/023,105

(22) Filed: Dec. 27, 2004

(65) Prior Publication Data
US 2006/0137747 A1  Jun. 29, 2006

(51) Int. Cl.
F16K 25/00 (2006.01)
(52) U.S. Cl. .................... 137/454.6; 137/512; 137/543
(58) Field of Classification Search ............ 137/454.2, 137/454.6, 512, 540, 542, 543, 543.13
See application file for complete search history.

(56) References Cited

U.S. PATENT DOCUMENTS

| 1,486,567 | A | * | 3/1924 | Deacon | 137/540 |
|---|---|---|---|---|---|
| 1,712,798 | A | * | 5/1929 | Johnston et al. | 119/14.38 |
| 4,084,609 | A | * | 4/1978 | Johnson | 137/327 |
| 4,159,025 | A | * | 6/1979 | Harthun | 137/512 |
| 4,203,466 | A | * | 5/1980 | Hager | 137/543 |
| 4,257,443 | A | * | 3/1981 | Turney | 137/269.5 |
| 5,207,242 | A | * | 5/1993 | Daghe et al. | 137/454.6 |
| 5,349,934 | A | * | 9/1994 | Miyano | 123/519 |
| 6,142,037 | A | * | 11/2000 | Botosan et al. | 74/606 R |
| 6,579,448 | B2 | * | 6/2003 | Dworatzek | 210/130 |
| 6,792,925 | B2 | * | 9/2004 | Dworatzek et al. | 123/573 |

* cited by examiner

Primary Examiner—Eric Keasel
Assistant Examiner—Craig Price
(74) Attorney, Agent, or Firm—Wood, Phillips, Katz, Clark & Mortimer

(57) ABSTRACT

Poppet valve installation or removal is simplified through the use of a unitary poppet assembly that may be accurately placed into a valve body through an access opening and wherein the poppet is slidably mounted in a stem in an insert while being permanently affixed thereto by the interference fit between a shoulder on the poppet stem and a post within the sleeve.

23 Claims, 5 Drawing Sheets

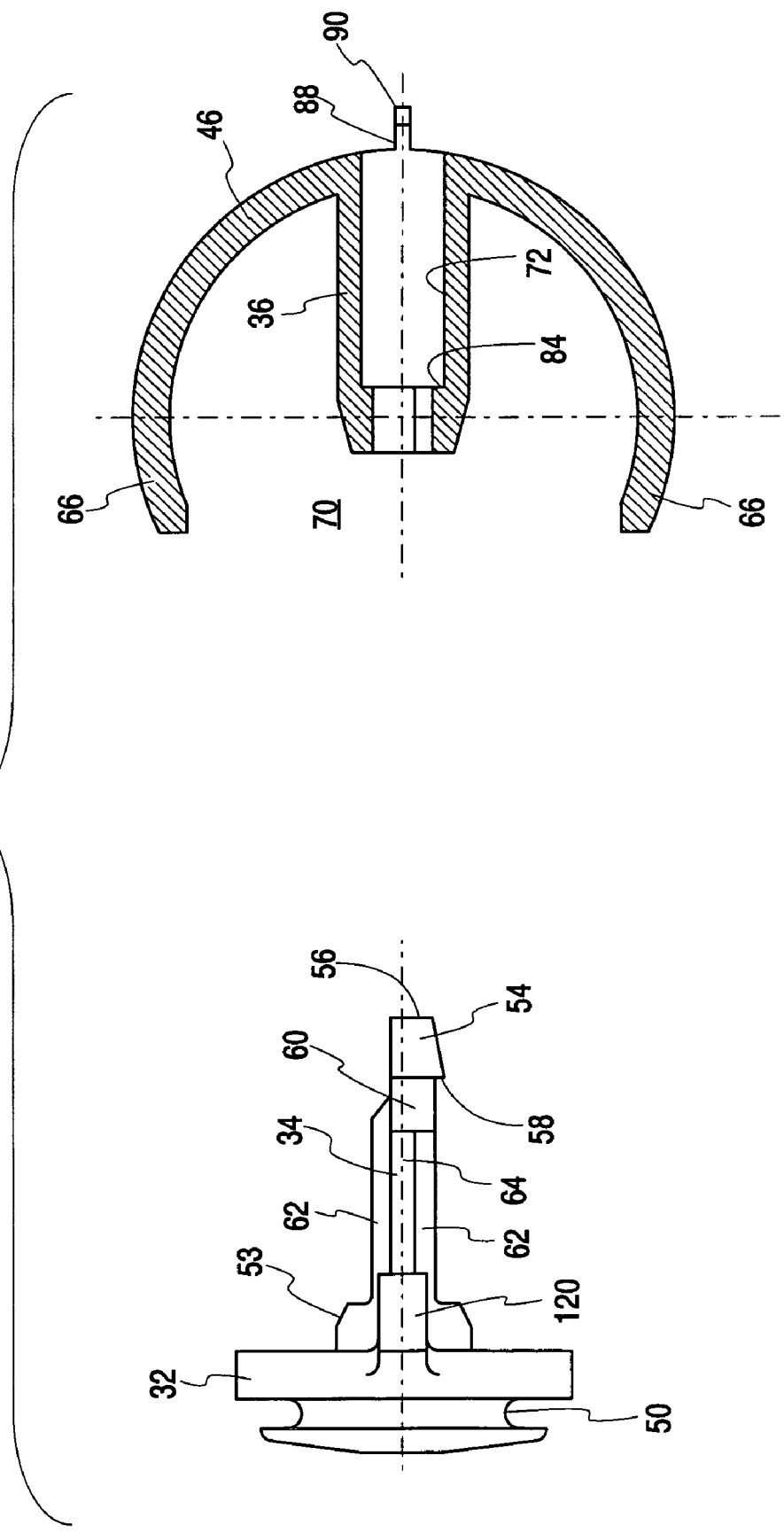

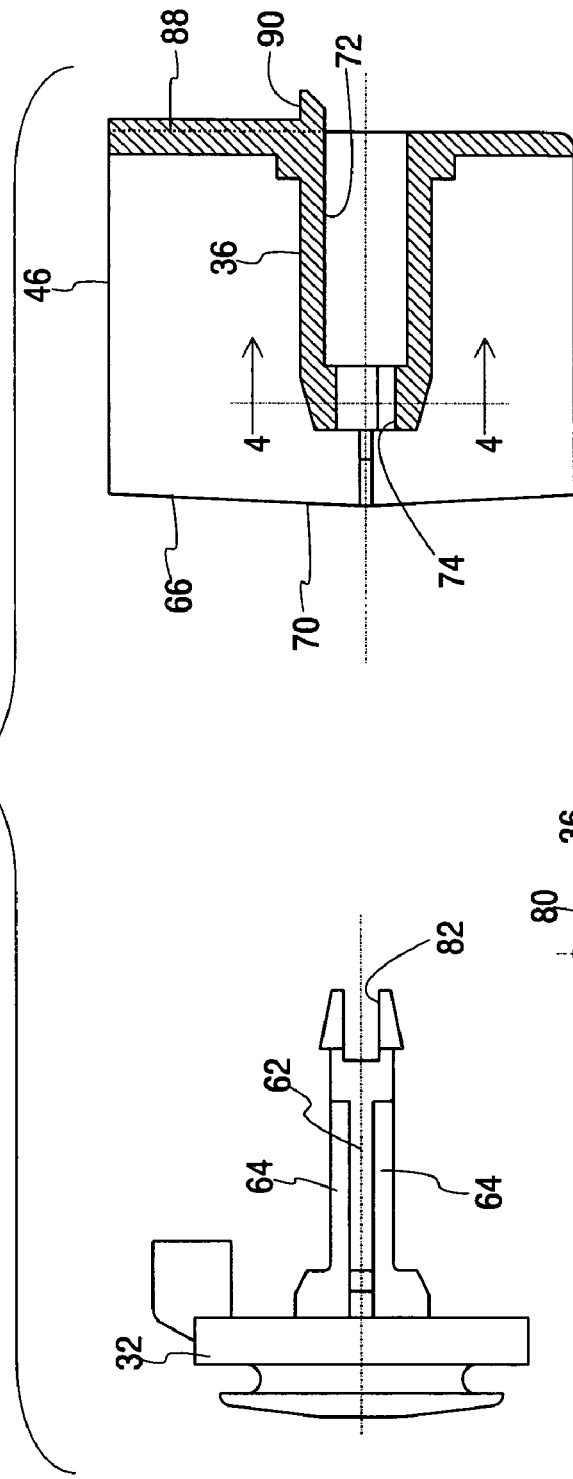

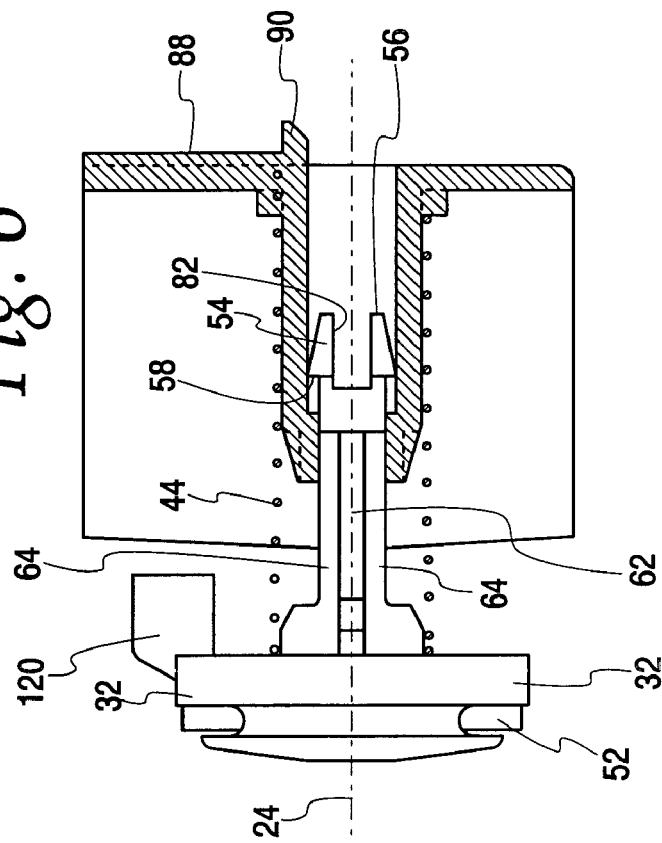
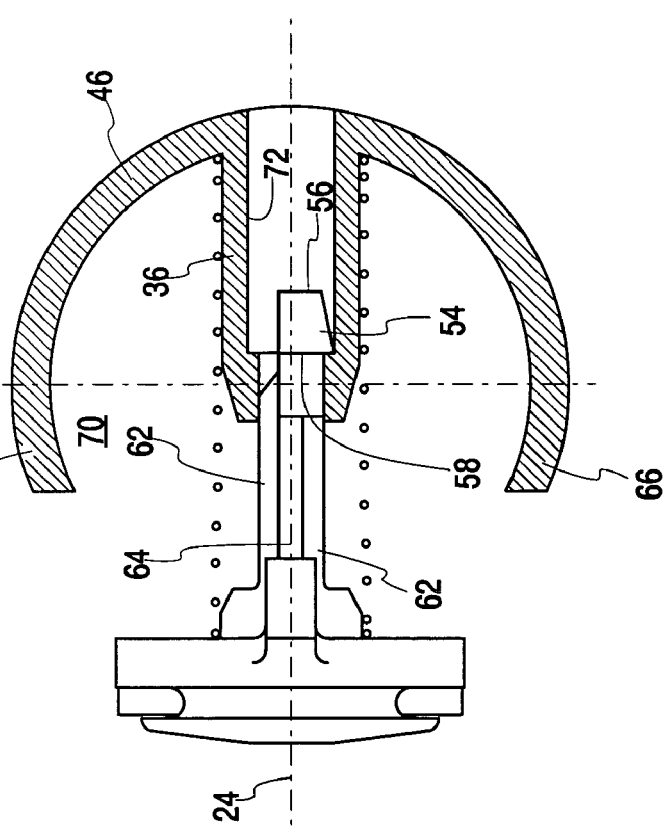

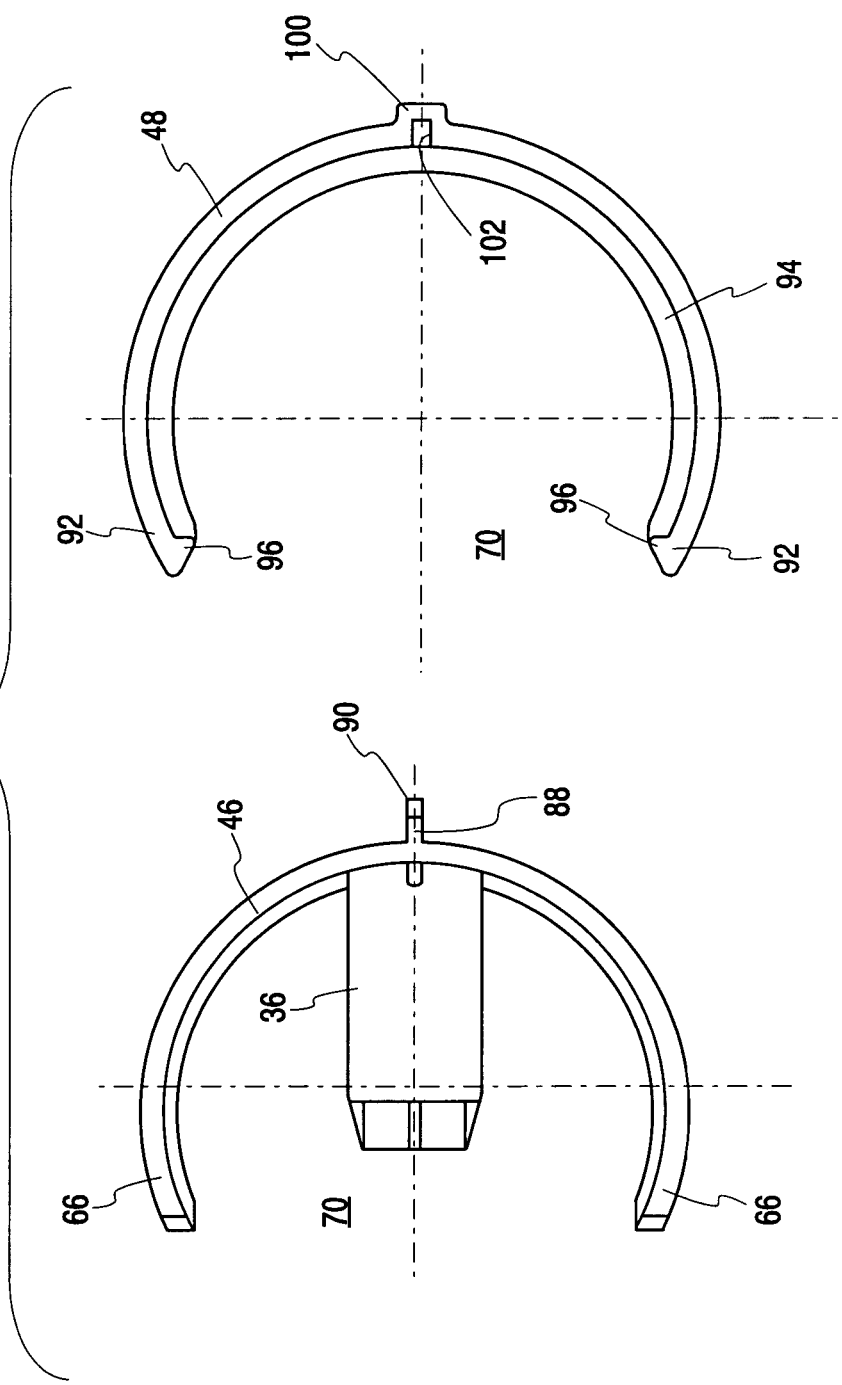

ANGLED DUAL CHECK VALVE

FIELD OF THE INVENTION

This invention relates to angled dual check valves.

BACKGROUND OF THE INVENTION

Commonly assigned U.S. Pat. No. 5,207,242 granted May 4, 1993 to Daghe et al., the entire disclosure of which is herein incorporated by reference, discloses an angled dual check valve construction. The check valve is to prevent back flow of fluid along a flow path and includes a check valve construction having an outlet flow which is discharged at a right angle with respect to the direction of an inlet flow. As disclosed therein, it is generally known to employ redundant valves including an inlet valve member and an outlet valve member to achieve a high degree of reliability in the check valve construction. Prior to the invention of the '242 patent, the valve members were arranged "in-line" in a housing such that the valve members were movable along a common axis to alternatively open and close the check valve. To avoid an overly large or long housing, and the associated inherent excess weight and cost, as well as the suitability for use in applications having restrictive envelope requirements, the '242 construction was invented and has been quite successful for its intended purpose. At the same time, assembling and/or servicing the inlet check valve in that construction occasionally can be difficult because of the possibility of disassociation of the components of the inlet check valve, one from the other. Such disassociation of the components typically can result during installation or removal of the inlet check valve components from the valve housing due to the bias of the spring employed in the inlet check valve.

Furthermore, support for the poppet employed in the inlet check on its guide is over a relatively small bearing area which can result in a tendency of components canting in relation to one another with the resultant lowering of efficiency in terms of an increased flow loss.

In addition, it would be desirable to more accurately affix the location of an insert sleeve and a valve mounting element with relation to one another and within the body.

The present invention is directed to overcoming one or more of the above problems.

SUMMARY OF THE INVENTION

It is the principal object of the invention to provide a new and improved check valve, preferably an angled dual check valve. The check valve, in one embodiment, includes a valve body having a first fluid port and a second fluid port generally at right angles to one another together with an access port parallel to or aligned with one of the fluid ports. A removable closure normally closes the access port. A unitary poppet assembly is insertable into and removable from the body through to the access port when the access port is not closed and includes a sleeve-like element of a shape generally the same as the access port and of a size sufficiently small to move through the access port. A poppet valve is secured to the sleeve-like element and is slidable therein toward and away from a valve seat located about the other of the fluid ports. A biasing spring is mounted on the sleeve-like element between the sleeve-like element and the poppet valve and normally biases the poppet valve toward the seat. A relief is provided in the sleeve-like element through which the poppet valve may move between a position substantially within the envelope of the sleeve-like element and a position outside the envelope in sealing engagement with the valve seat.

Because the poppet assembly is a unitary assembly, disassociation during assembly or disassembly is avoided. In a preferred embodiment, the poppet valve is slidable in a direction that is generally at right angles to both the one fluid port and the access port.

A preferred embodiment contemplates that the sleeve-like element be generally in the shape of a C having an opening at one side bounded by the extremities of upper and lower arms of the C shape and the relief is defined by the opening.

In one embodiment of the invention, the sleeve-like element is a two-piece element having inner and outer sleeves nested and in abutment with one another.

In one embodiment, the inner sleeve includes an inner, generally radially extending post generally coaxial with the valve seat, and the poppet valve includes a stem attached to the post and slidable thereon.

Preferably, one of the stem and the post includes a fixed shoulder for retaining the other of the stem and the post.

In a preferred embodiment, the other of the stem and the post includes a flexible and resilient shoulder engageable with the fixed shoulder to maintain the stem and the post in assembled relation. The spring may be compression coil spring surrounding the post and the stem.

In a highly preferred embodiment, the poppet valve is secured to the sleeve-like element by a snap-fit connection.

An even more preferred embodiment of the invention contemplates that the poppet valve include a stem extending away from the valve seat and that the sleeve-like element include a post directed toward the valve seat. The snap-fit connection includes a bifurcation in one of the stem and the post and a shoulder for retaining the stem on the post on the other of the stem and the post.

In one embodiment, the bifurcation is at one end of the stem remote from the valve seat and the shoulder is on the post at an end thereof closest to the valve seat.

Preferably, the post has an open interior telescopingly, slidingly receiving the stem.

In one embodiment, the stem has a cross-like cross section intermediate its ends and the open interior of the post is at least partially configured to mate with the cross-like cross section.

In a highly preferred embodiment, one end of the stem that is remote from the valve seat has a partial frustoconical shape that is bifurcated with an enlarged shoulder facing the valve seat and the open interior of the post has a partial cross-like shape and a partial cylindrical shape of a size to receive and compress the frustoconical shape along with an enlarged shoulder facing away from the valve seat. The enlarged shoulders are in interference relation to retain the stem and the post while allowing reciprocal movement between the two.

In a highly preferred embodiment, where the sleeve-like element includes an inner sleeve and an outer sleeve, the closure includes a shoulder facing and embracing both the inner and outer sleeves at an adjacent end thereof along with an annular projection extending into the inner sleeve to locate the sleeve-like element in the body.

Preferably, the inner sleeve is snap-fit secured to the outer sleeve.

Further, one of the sleeves has a longitudinal groove and the other of the sleeves has a longitudinal rib received in the groove to relatively locate the sleeves with respect to one another.

In a highly preferred embodiment, the rib includes a hook snap-fitted in an opening in the groove.

Other objects and advantages will become apparent from the following specification taken in connection with the accompanying drawings.

DESCRIPTION OF THE DRAWINGS

FIG. 2 is an exploded view of a poppet and an inner sleeve used in the unitary check valve assembly of the invention;

FIG. 3 is a view similar to FIG. 2, but taken at 90 degrees with respect thereto;

FIG. 4 is a sectional view taken approximately along the line 4—4 in FIG. 3;

FIG. 5 is a view similar to FIG. 2 but showing the components assembled together with the addition of a biasing spring;

FIG. 6 is a view similar to FIG. 5 but taken at 90 degrees with respect thereto; and FIG. 7 is an exploded view of the inner and outer sleeves of the unitary check valve assembly.

DESCRIPTION OF THE PREFERRED EMBODIMENT

Figure 1:
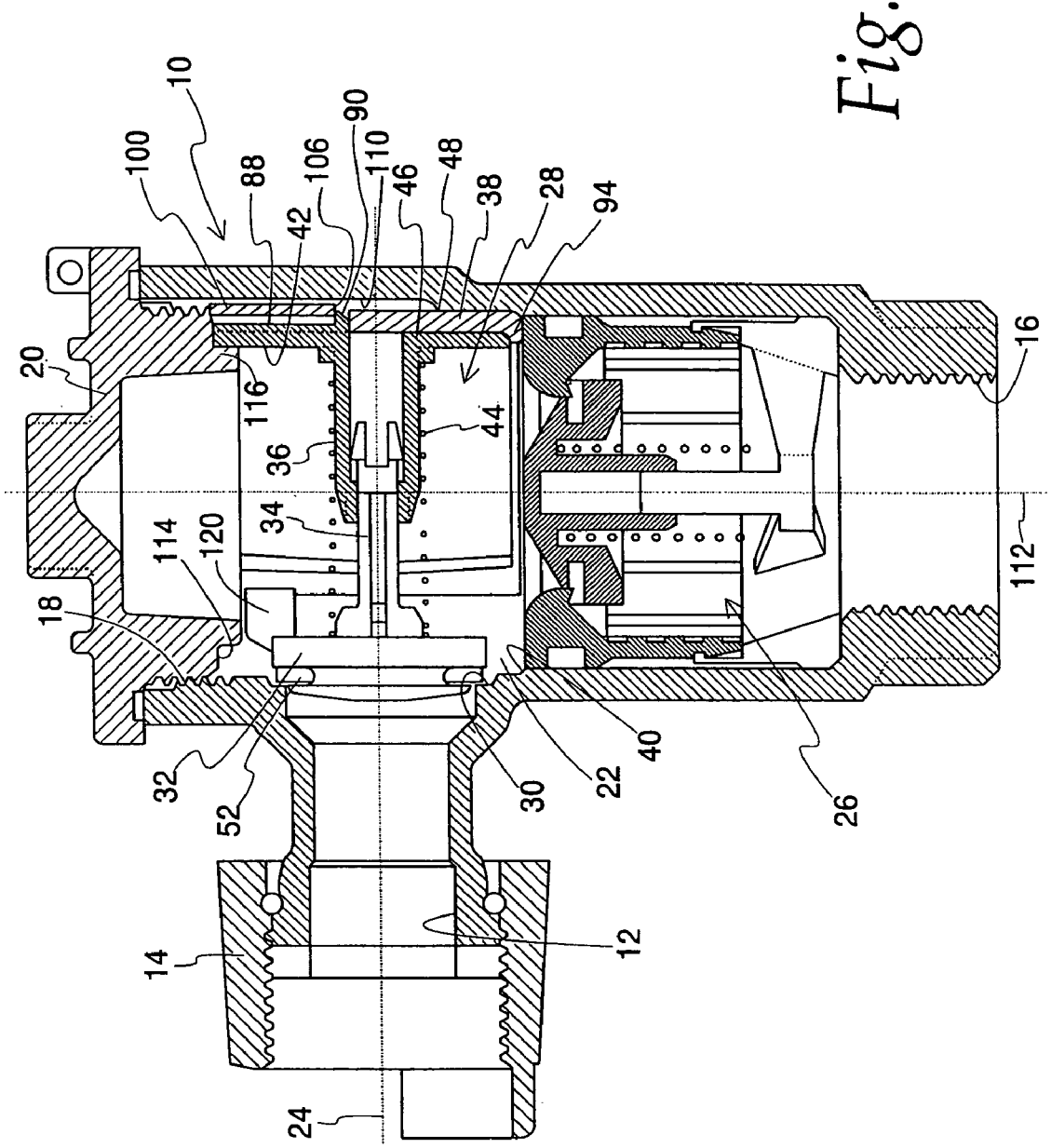
FIG. 1 is a sectional view of a dual angle check valve made according to the invention.

With reference to FIG. 1, a valve of one embodiment of the invention is seen to include a valve housing, generally designated 10, having an inlet port 12 to which is fitted a rotatable, internally threaded nut 14 by means of which the same may be connected into a fluid system. Also included is an internally threaded outlet port 16 and it will be observed in FIG. 1 that the inlet port 12 is at right angles to the outlet port 16.

Directly opposite the outlet port, and coaxial therewith, is an access port 18 which, when the valve is in use, is closed by a threaded cap 20. The cap 20 is removable to allow access to the interior 22 of the body 10.

Immediately adjacent the outlet port 16, and within the body interior 22 at a location below the longitudinal axis of the inlet valve 12 as shown by a line 24, is an outlet check valve assembly generally designated 26, which may be of the same construction disclosed and described in greater detail in the previously identified '242 patent.

It will be observed that the closure 20, when fully threaded onto the body 10 locates an inlet check valve, which is a unitary assembly and which is generally designated 28 in alignment with the inlet 12 and coaxial with the axis 24. Facing the interior 22 of the body 10 and coaxial with the axis 24 is an annular valve seat 30 against which the poppet valve 32 of the unitary poppet valve assembly 28 may seat. The poppet valve 32 includes a valve stem 34 that extends away from the inlet 12 to be slidably mounted to a post 36 on a sleeve-like element 38 which is sandwiched between the closure 20 and an annular shoulder 40 on the interior 22 of the body 10 just above the upper end of the outlet poppet assembly 26 as viewed in FIG. 1. A compression coil spring 44 is mounted about the post 36 and extends between the side of the poppet 32 remote from the inlet 12 and an interior wall 42 of the sleeve-like assembly 38 as will be described in greater detail hereinafter. The function of the spring 44 is, of course, to bias the poppet 32 toward the seat 30.

In reality, the sleeve-like element 38 is formed of two sleeves, an inner sleeve 46 which bears the post 36 and an outer sleeve 48 which snugly receives and locates the inner sleeve 46 at the desired location within the housing 10.

Turning now to FIGS. 2 and 3, the poppet 32, on its side facing the inlet 12, includes a peripheral, radially outwardly opening groove 50 which receives a seal 52 (FIG. 1) that seals against the valve seat 30. The valve stem 34, at its end where it is connected to the poppet 32, includes a locating platform 53 which receives and locates one end of the spring 44 (not shown in FIGS. 2 and 3) while the opposite end of the stem 34 terminates in a partial, frustoconical configuration 54. The minor base 56 of the partial frustoconical formation 54 is remote from the poppet 32 while the major base 58 is closest to the poppet 32 and defines an enlarged shoulder facing the seat 30 for purposes to be seen. A partial cylinder 60 connects the partial frustoconical section 54 to the remainder of the stem 34 which has a cross-like cross section as can be ascertained from a consideration of FIG. 2 with FIG. 3. That is to say, the stem 34, intermediate its ends, includes two arms 62 of the cross extending in opposite directions while, as seen in FIG. 3, two other arms 64, also extending in opposite directions and at right angles to the arms 62, are provided.

The inner sleeve 46 (and for that matter the outer sleeve 48 as well) are both C-shaped to have arms whose extremities 66 define a relief opening 70 just to the left of the post 36. The post 36 is hollow and includes a generally cylindrical interior section 72 remote from the opening and an interior bearing section 74 closest to the opening 70 and which is shown in greater detail in FIG. 4. As can be seen, the bearing section 74 includes a partial cylindrical surface 76 sized to allow the minor base 56 of the frustoconical section 54 (FIGS. 2 and 3) to enter the hollow center of the post 36. Joined to the partial cylindrical surface 76 is a partial cross shaped surface 78 which is configured to matingly and slidably receive the stem 34, and specifically, one cross arm 62. The opposite cross arm 62 is received within the partial cylindrical section 76 while the cross arm 64 abuts shoulders 80 where the partial cylindrical surface 76 joins to the partial cross shaped surface 76.

The major base 58 (FIGS. 2 and 3) of the partial frustoconical formation 54 is larger than the partial cylindrical surface 76. At the same time, as best seen in FIGS. 3 and 6, the same is bifurcated as at 82, and the bifurcation 82 extends into the partial cylindrical section 60 of the stem 34.

The poppet valve stem 34 is made of a resilient material and the cylindrical interior 72 of the inner sleeve 46 is of a diameter just slightly greater than the diameter of the major base 58 of the partial frustoconical structure 54. This, in turn, results in an enlarged shoulder 84, which faces away from the seat 30 being located between the cylindrical interior 72 of the post 36 and the end thereof adjacent the relief or opening 70. Consequently, the stem 34 may be inserted into the post 36 with the partial frustoconical section 54 collapsing about the bifurcation 82 until the same enters the cylindrical section 72, at which time, its resilience will restore it to the shape illustrated in FIGS. 2, 3, 5, and 6 and the major base 58 will act as a shoulder in interference relation with the shoulder 84. Thus, a snap-fit, permanent connection is defined, but one which will allow the stem 34 to slide within the post 36 away from a position representing a closed position of the poppet 32 against the seal 52. Of course, the spring 44 is installed about the post 36 and against the back of the poppet before such assembly takes place.

It will also be observed in FIGS. 2, 3 and 6 that the side of the inner sleeve 46 aligned with the post 36 includes a vertical rib 88 which extends down to the cylindrical opening 72 and terminates therein in a hook 90.

Turning now to FIG. 7, the relationship of the inner sleeve 46 to the outer sleeve 48 will be described. The outer sleeve 48, like the inner sleeve 46, is C-shaped and has extremities 92 which, together with the extremities 66 of the inner sleeve 46, serve to define the relief for opening 70.

At its lower end, the outer sleeve includes a radially inwardly directed shoulder 94 as can be seen in FIGS. 1 and 7.

Furthermore, the extremities 92 of the outer sleeve 48 include inwardly directed shoulders 96 against which the extremities 66, the inner sleeve 46 abut when the inner sleeve 46 is nested in the outer sleeve 48. In this connection, the outer diameter of the inner sleeve 46 is the same as the inner diameter of the sleeve 48 and somewhat greater than the inner diameter of the shoulder 94 on the outer sleeve 48.

Approximately, the upper half of the outer sleeve 48 is provided with a radially outwardly directed rib 100 in which is placed a radially inwardly opening groove 102. The rib 100 terminates, at its lower end, in an opening 106, discernable upon close inspection of FIG. 1, which is sized to snap-fit receive the hook 90 (FIG. 6) on the rib 88 of the inner sleeve in a snap-fit manner. The relationship is such that the extremities 66 of the sleeve 46 firmly abut the shoulders 96 on the extremities 92 of the outer sleeve 48 with the lower end of the inner sleeve 46 abutting the shoulder 94 of the outer sleeve 48 as shown in FIG. 1 and with the rib 88 of the inner sleeve 46 received within the opening 102 of the outer sleeve 48 at the lower end of the rib 100 thereof. Thus, the inner sleeve 46 is firmly, spatially related to the outer sleeve 46 and connected thereto by the snap-fit connection provided by the hook 90 and associated structure.

The rib 100 on the outer sleeve 48 is slidably received in a groove 110 (FIG. 1) to firmly orient unitary poppet assembly 28 thus formed with the poppet 32 and seal 52 carried thereby aligned along the axis 24 to seat against the seat 30 (FIG. 1).

This alignment is provided to achieve a proper angular relationship with the seat 30 about an axis represented by a line 112 in FIG. 1.

To provide proper orientation along the axis 24 in a longitudinal direction, it is desired that the lower side of the shoulder 94 of the outer sleeve 48 be firmly abutted against the shoulder 40 on the interior 22 of the housing 10. It is also desired to achieve a locating function at the opposite end of the unitary poppet assembly 28 and this is achieved by means of a shoulder 114 located just inwardly of the threads 18 on the cap 20. The shoulder 114, as seen in FIG. 1, abuts the upper ends of both the inner sleeve 46 and the outer sleeve 48. Moreover, just inwardly of the shoulder 114 is an axially directed, annular shoulder 116 which is sized to enter the inner sleeve 46 at its upper end to positively assure that the extremities 66 and all of the inner sleeve 46 between those extremities is in functional abutment with the radially inner side surface of the outer sleeve 48.

Finally, it is noted that the poppet 32 is provided with a locating tab 120 as seen, for example, in FIGS. 1, 2, and 6. With the access cover or cap 20 removed, it is an easy matter to grasp the tab 120 and pull the poppet 32 away from the seat 30 against the bias of the spring 44. Once the poppet 32 has cleared the seat 30, the unitary assembly 28 may be axially moved along the axis 112 out of the access opening 18, the sleeve-like element 38 sliding outwardly in the groove 110 (FIG. 1). Once the poppet assembly 28 is clear of the valve body 10, the components will remain associated in spite of the bias of the spring 44 because of the interference occurring between the enlarged shoulder defined by the major base 58 of the partial frustoconical formation 54 and the enlarged shoulder 84 within the hollow interior 72 of the post 36.

Of course, assembly of the unitary valve 28 to the check valve occurs in the reverse order and during that manipulation, disassembly of the same into component parts is similarly avoided.

It will also be appreciated that the juncture of the major base 58 with the side of the partial frustoconical section 54 engages the inner wall 72 of the hollow interior of the stem 36 while the cross-shaped cross section defined by arms 62, 64 is snugly and slidably guided by the groove 78 and the shoulders 80 (FIG. 4) in the post 36.

As a consequence, an extended bearing surface that is considerably improved over that provided in the '242 patent exists. This improved bearing surface prevents canting of the stem 34 within the post 36 which could lead to some binding. Should such binding occur, the poppet 32 might not fully open with the result that the valve would provide an increased flow resistance which typically would be undesirable. With the extended bearing surface provided by the components as described above, any tendency to cant is virtually eliminated so greater efficiency of operation and decreased flow resistance results.

Furthermore, the unique combination of elements defining the sleeve-like insert 38 provides for an accurate locating of the insert sleeve within the valve body 10, eliminating misalignment of the unitary poppet assembly 28 with the seat 30 thereby increasing performance of the valve.

What is claimed is:

1. A check valve comprising: a valve body having a first fluid port and a second fluid port generally at right angles to one another, and an access port parallel to or aligned with one of said fluid ports; a removable closure normally closing said access port; and a unitary poppet assembly insertable into and removable from said body through said access port when said access port is not closed and including a sleeve-like element of a shape generally the same as said access port and a size sufficiently small to move through said access port, a poppet valve secured to said sleeve-like element and slidable therein toward and away from a valve seat located about the other of said fluid ports, a biasing spring mounted on said sleeve-like element between said sleeve-like element and said poppet valve and normally biasing said poppet valve toward said seat, and a relief in said sleeve-like element through which said poppet valve may move between a portion substantially within the envelope of said sleeve-like element and a position outside said envelope and in sealing engagement with said valve seat, wherein said poppet valve is secured to said sleeve-like element by a snap-fit connection, wherein said post has an open interior slidably receiving a stem, wherein said stem has a cross-like cross section intermediate its ends and said open interior is at least partially configured to mate with said cross-like cross section, and wherein an end of said stem remote from said valve seat has a partial frustoconical shape that is bifurcated with an enlarged shoulder facing said valve seat and said open interior has a partial cross-like shape and a partial cylindrical shape of a size to receive and compress said frustoconical shape, and an enlarged shoulder facing away said valve seat, said enlarged shoulder being in interference relation to retain said stem in said post for reciprocal movement thereon.

2. The check valve of claim 1, wherein said poppet valve is slidable in a direction that is generally at right angles to both said one fluid port and said access port.

3. The check valve of claim 1 wherein said sleeve-like element is generally in the shape of a C having an opening in one side bounded by extremities of upper and lower arms of the C shape, and said relief is defined by said opening.

4. The check valve of claim 1 wherein said sleeve-like element is a two-piece element having inner and outer sleeves nested and in abutment with one another.

5. The check valve of claim 4 wherein said inner sleeve includes an inner, generally radially extending post generally coaxial with said valve seat and said poppet valve includes a stem attached to said post and slidable thereon.

6. The check valve of claim 5 wherein one of said stem and said post includes a fixed shoulder for retaining the other of said stem and said post.

7. The check valve of claim 6 wherein said other of said stem and said post includes a flexible and resilient shoulder engageable with said fixed shoulder to maintain said stem and said post in assembled relation.

8. The check valve of claim 7 wherein said spring is a compression coil spring surrounding said post and said stem.

9. The check valve of claim 1 wherein said inner sleeve includes an inner, generally radially extending post generally coaxial with said valve seat and said poppet valve includes a stem attached to said post and slidable thereon.

10. The check valve of claim 9 wherein one of said stem and said post includes a fixed shoulder for retaining the other of said stem and said post.

11. The check valve of claim 10 wherein said other of said stem and said post includes a flexible and resilient shoulder engageable with said fixed shoulder to maintain said stem and said post in assembled relation.

12. The check valve of claim 11 wherein said spring is a compression coil spring surrounding said post and said stem.

13. The check valve of claim 1 wherein said poppet valve includes said stem extending away from said valve seat and said sleeve-like element includes a post directed toward said valve seat, and said snap-fit connection includes a bifurcation in one of said stem and said post, and a shoulder for retaining said stem on said post on the other of said stem and said post.

14. The check valve of claim 13 wherein said bifurcation is at one end of said stem remote from said valve seat and said shoulder is on said post at an end thereof closest said valve seat.

15. The check valve of claim 14 wherein said post has an open interior slidably receiving said stem.

16. A check valve comprising: a valve body having a first fluid port and a second fluid port generally at right angles to one another, and an access port parallel to or aligned with one of said fluid ports; a removable closure normally closing said access port; and a poppet assembly insertable into and removable from said body through said access port when said access port is not closed and including a sleeve-like element of a shape generally the same as said access port and a size sufficiently small to move through said access port, a poppet valve secured to said sleeve-like element and slidable therein toward and away from a valve seat located about the other of said fluid ports, a biasing spring mounted on said sleeve-like element between said sleeve-like element and said poppet valve and normally biasing said poppet valve toward said seat, and a relief in said sleeve-like element through which said poppet valve may move between a position substantially within the envelope of said sleeve-like element and a position outside said envelope and in sealing engagement with said valve seat, the poppet valve having a valve stem extending away from said valve seat, said sleeve-like element including a hollow post slidably receiving and guiding said stem and comprised of an inner sleeve nested in an outer sleeve; said closure including a shoulder facing and embracing both said inner and outer sleeves at an adjacent end thereof and an annular projection extending into said inner sleeve to locate said sleeve-like element in said body.

17. The check valve of claim 16 wherein said inner sleeve is snap-fit secured to said outer sleeve.

18. The check valve of claim 17 wherein one of said sleeves has a longitudinal groove and the other of said sleeves has a longitudinal rib received in said groove.

19. The check valve of claim 18 wherein said rib includes a hook snap-fitted in an opening in said groove.

20. The check valve of claim 19 wherein said rib and said hook are on said inner sleeve and said groove and said opening are located in said outer sleeve.

21. A check valve comprising: a valve body having a first fluid port and a second fluid port generally at right angles to one another, and an access port parallel to or aligned with one of said fluid ports; a removable closure normally closing said access port; and a poppet assembly insertable into and removable from said body through said access port when said access port is not closed and including a sleeve-like element of a shape generally the same as said access port and a size sufficiently small to move through said access port, a poppet valve secured to said sleeve-like element and slidable therein toward and away from a valve seat located about the other of said fluid ports, a biasing spring mounted on said sleeve-like element between said sleeve-like element and said poppet valve and normally biasing said poppet valve toward said seat, and a relief in said sleeve-like element through which said poppet valve may move between a position substantially within the envelope of said sleeve-like element and a position outside said envelope and in sealing engagement with said valve seat, the poppet valve having a valve stem extending away from said valve seat, said sleeve-like element including a hollow post slidably receiving and guiding said stem and comprised of an inner sleeve nested in an outer sleeve; said stem having a cross-like section intermediate its ends and said hollow post having an interior side of partial cross shape matingly and slidably receiving said cross-like section of said stem.

22. The check valve of claim 21 wherein an end of said stem remote from said valve seat has a partial frustoconical shape that is bifurcated with an enlarged shoulder facing said valve seat and said open interior has a partial cross-like shape and a partial cylindrical shape of a size to receive and compress said frustoconical shape, and an enlarged shoulder facing away from said valve seat, said enlarged should being in interference relation to retain said stem in said post for reciprocal movement thereon.

23. The check valve of claim 22 wherein an end of said stem remote from said valve seat has a partial frustoconical shape that is bifurcated with an enlarged shoulder facing said valve seat and said open interior has a partial cross-like shape and a partial cylindrical shape of a size to receive and compress said frustoconical shape, and an enlarged shoulder facing away from said valve seat, said enlarged should being in interference relation to retain said stem in said post for reciprocal movement thereon;

said closure including a shoulder facing and embracing both said inner and outer sleeves at an adjacent end thereof and an annular projection extending into said inner sleeve to locate said sleeve-like element in said body.

* * * * *